United States Patent
Tatarek

(10) Patent No.: US 9,067,461 B2
(45) Date of Patent: Jun. 30, 2015

(54) GAS PRESSURE CONTROL VALVE

(71) Applicant: Andrew Richard Thomas Tatarek, Aldershot (GB)

(72) Inventor: Andrew Richard Thomas Tatarek, Aldershot (GB)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/019,655

(22) Filed: Sep. 6, 2013

(65) Prior Publication Data

US 2014/0000809 A1 Jan. 2, 2014

Related U.S. Application Data

(63) Continuation of application No. 13/080,023, filed on Apr. 5, 2011, now Pat. No. 8,550,108.

(51) Int. Cl.
| | |
|---|---|
| F16K 43/00 | (2006.01) |
| B44C 1/22 | (2006.01) |
| G05D 16/10 | (2006.01) |
| F16K 17/00 | (2006.01) |

(52) U.S. Cl.
CPC .............. *B44C 1/227* (2013.01); *G05D 16/103* (2013.01); *F16K 17/00* (2013.01)

(58) Field of Classification Search
USPC ......... 137/68.29, 318; 222/5; 251/149, 149.5, 251/149.6, 149.7
See application file for complete search history.

(56) References Cited

U.S. PATENT DOCUMENTS

| | | | | |
|---|---|---|---|---|
| 5,320,252 A | * | 6/1994 | Fleming | 222/145.1 |
| 5,894,869 A | * | 4/1999 | Mussack | 141/19 |
| 6,659,757 B2 | * | 12/2003 | Kim et al. | 425/376.1 |
| 7,296,782 B2 | * | 11/2007 | Enerson et al. | 251/149.7 |
| 2006/0156983 A1 | * | 7/2006 | Penelon et al. | 118/723 E |
| 2007/0209703 A1 | * | 9/2007 | Neumann et al. | 137/102 |
| 2008/0073608 A1 | * | 3/2008 | Haefner et al. | 251/120 |

* cited by examiner

*Primary Examiner* — John K Fristoe, Jr.
*Assistant Examiner* — Kevin Barss
(74) *Attorney, Agent, or Firm* — David A. Hey

(57) ABSTRACT

A gas pressure control valve having a valve body with a gas inlet and a gas outlet is described. An inner cap is provided bounding in part a chamber within the valve body in communication with the gas inlet. The valve body contains a spring loaded piston comprising a piston head and a piston rod. The piston rod includes a conduit providing communication between the chamber bounded in part by the inner cap and a chamber adjacent the piston head and the gas outlet. The piston is operable to move between a closed configuration in which the piston rod prevents communication between the gas inlet and the chamber bounded in part by the inner cap and an open configuration in which the piston rod permits communication between the gas inlet and the chamber bounded in part by the inner cap. The piston head is in a sealing engagement with the valve body via a first seal and the piston rod is in a sealing engagement with the inner cap via a second seal contained within the chamber bounded in part by the inner cap, the second seal being held in a fixed position within the chamber.

15 Claims, 5 Drawing Sheets

GAS PRESSURE CONTROL VALVE

BACKGROUND OF THE INVENTION

The present application relates to a gas pressure control valve for receiving gas from a high pressure source and supplying the gas at a low pressure to a user. More particularly embodiments of the present invention concern a compact gas pressure control valve for regulating gas pressures from low capacity gas capsules (e.g. a water capacity of 5 to 100 ml with a typical commercial size being 21 ml).

Typically gas is stored within gas cylinders at high pressures (e.g. 200 bar). However, often in use much lower pressures are required. It is therefore necessary to provide a gas pressure control valve which can regulate the pressure of gases. In addition to providing a means to provide gas at a lower pressure to a user, gas pressure control valves also enable the pressure of gas to be controlled and maintained at a relatively constant rate which does not differ significantly whether a gas cylinder is empty or full.

Examples of prior gas pressure control valves are disclosed in U.S. Pat. No. 4,655,246 and U.S. Pat. No. 5,307,834.

Although prior valves do enable gas pressure to be regulated, existing designs are used in the context of regulating gas pressure from large gas cylinders. It would be desirable to be able to provide a gas pressure control valve which is suitable to regulate gas pressure from smaller capacity gas capsules. However, reducing the size of existing designs is difficult because the designs are sensitive to certain design parameters. Adapting existing designs for use with smaller gas cylinders is therefore difficult as such smaller valves would be unreliable unless they were to be manufactured to excessively high manufacturing tolerances. In particular it is difficult to make the high pressure sealing seat small enough to allow a very small piston, and still maintain pressure control over the range of pressures from the cylinder. As a consequence, conventional valves are not used with small capacity gas capsules and the gas flow from such capsules has not been regulated. This has limited the use of such capsules to applications where high pressure gas supply is required or alternatively applications such as the supply of liquefied gases where pressure is lower and constant as it is effectively controlled by the vapor pressure of the liquid.

An alternative design of gas pressure control valve which is suitable for use with low capacity gas capsules is therefore desired.

SUMMARY OF THE INVENTION

In accordance with one aspect of the present invention there is provided a gas pressure control valve comprising a valve body having a gas inlet and a gas outlet; an inner cap bounding in part a chamber within the valve body wherein the chamber is in communication with the gas inlet; a spring loaded piston contained within the valve body, the piston comprising a piston head and a piston rod, the piston rod including a conduit providing communication between the chamber bounded in part by the inner cap and interior of the valve body adjacent the piston head and the gas outlet; wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap; and wherein the piston head is in a sealing engagement with the valve body via a first seal and the piston rod is in a sealing engagement with the inner cap via a second seal contained within the chamber bounded in part by the inner cap, the second seal being held in a fixed position within the chamber.

The valve body may comprise a collar adjacent the has inlet wherein the second seal is held in a fixed position between the collar and the inner cap. A gas flow path may be provided to allow gas to pass through the collar to adjacent the inner cap. In some embodiments the collar comprises a castellated collar wherein the castellation of the collar provides the gas flow path allowing has to pass through the collar to adjacent the inner cap.

The has inlet may comprise a cavity containing an orifice seat in sealing, engagement with the cavity wherein the communication between the chamber and the has inlet is via an orifice in the orifice seat.

The piston rod may comprise a sealing pin at an end remote from the piston head, the piston rod being arranged within the valve body so that the sealing pin seals the orifice when the piston is in the closed position. The tip of the sealing pin can be chamfered to a point, wherein the piston rod is arranged within the valve body so that the tip of the sealing pin enters into and seals the orifice when the piston is in the closed position. The chamfering of the tip of the sealing pin and the arrangement of the piston rod within the valve body can then be such that the sealing pin is caused to be centered within the orifice as the tip of the sealing pin enters the orifice when the piston moves from the open position to the closed position.

In some embodiments the orifice comprises a lower section adjacent the gas inlet, a tapering section and an upper section adjacent the chamber wherein the upper section is narrower than the lower section.

In some embodiments at least part of the orifice has a diameter of approximately 0.3 mm.

In embodiments the valve may comprise a compression spring arranged within the valve body to bias the piston to move towards the open position. In such embodiments the compression spring may be arranged to encircle the inner cap and extend between a surface of the inner cap and a surface of the piston head. A recess may be provided in the piston head and the compression spring extends between a surface of the inner cap into the recess.

In some embodiments the first seal comprises a seal contained within a groove at the circumference of the piston head. Alternatively a stepped flange defining a recess may be provided at the circumference of tide piston head and first seal comprises a seal retained within the recess between the piston head and the valve body.

In some embodiments the inner cap may be in a sealing engagement with the valve body via a third seal wherein build up of pressure within the chamber bounded in part by the inner cap is operable to cause the sealing engagement to break permitting gases within the chamber to be vented via a relief aperture provided in the valve body.

The gas pressure control valve may be included as part of a gas supply apparatus comprising a housing defining a docking station for receiving a gas capsule where the valve is arranged to receive gas from a gas a capsule inserted in the docking station and pass gas to an output. Such a gas supply apparatus may form part of a device for forming non-thermal plasma which includes a plasma generating cell operable to receive gas from the output and apply an electrical potential to the received gas to generate a non-thermal plasma.

BRIEF DESCRIPTION OF THE DRAWINGS

Further aspects and embodiments of the present invention will become apparent with reference to the accompanying description and drawings in which.

DETAILED DESCRIPTION OF THE INVENTION

Figure 1:
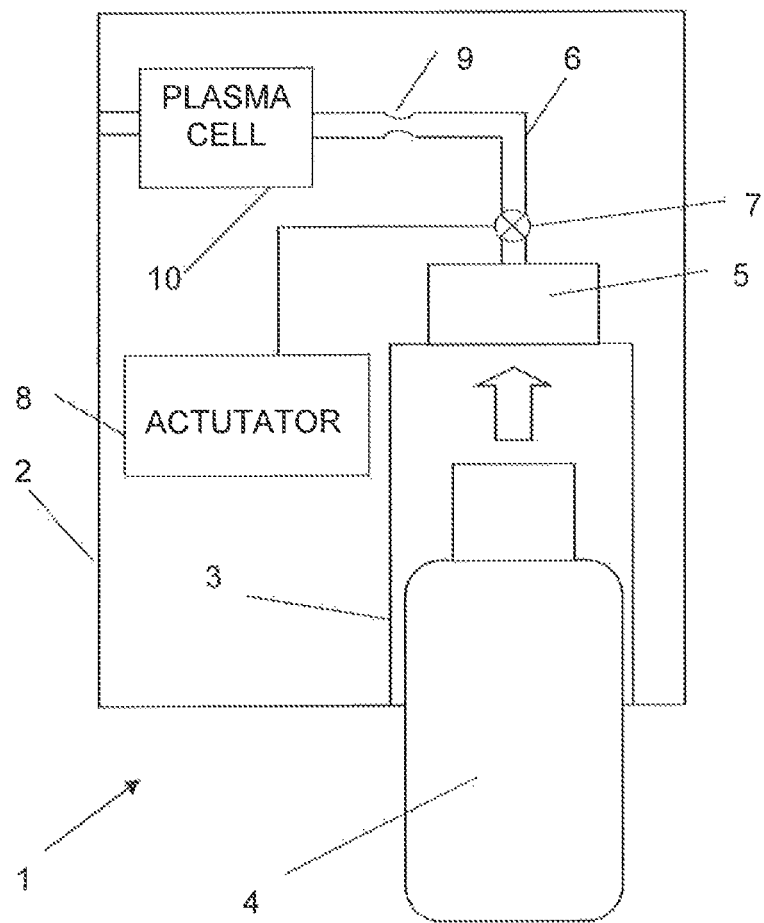
FIG. 1 is a schematic illustration of a device for generating non-thermal plasma incorporating a gas pressure control valve in accordance with the present invention.

FIG. 1 is a schematic diagram of a handheld device 1 for generating non-thermal plasma comprising a housing 2 which defines a docking station 3 for receiving a gas capsule 4 when the gas capsule is inserted into the docking station in the direction indicated by the arrow. In this embodiment the gas capsule 4 comprises a 100 ml capacity gas capsule. When fully inserted into the docking station 3, the gas capsule 4 is arranged to seal to a gas pressure control valve 5. As will be described in detail the gas pressure control valve 5 is such to receive gas at high pressure from the gas capsule 4 and to pass the gas at a controlled lower pressure to an output 6 having a valve 7 controlled by an actuator 8 and a restriction 9. When activated by the actuator 8 the valve 7 opens allowing gas to pass through the valve 7 to a plasma cell 10 via the restriction 9. The combined effect of the gas pressure control valve 5 and the restriction 9 is to cause gas to enter the plasma cell 10 at a controlled rate. When an electrical potential is applied to the gas within the plasma cell 10 a non-thermal plasma is generated. The device might carry its own power source or alternatively be connected by a suitable cable to an external power source.

Figure 2:
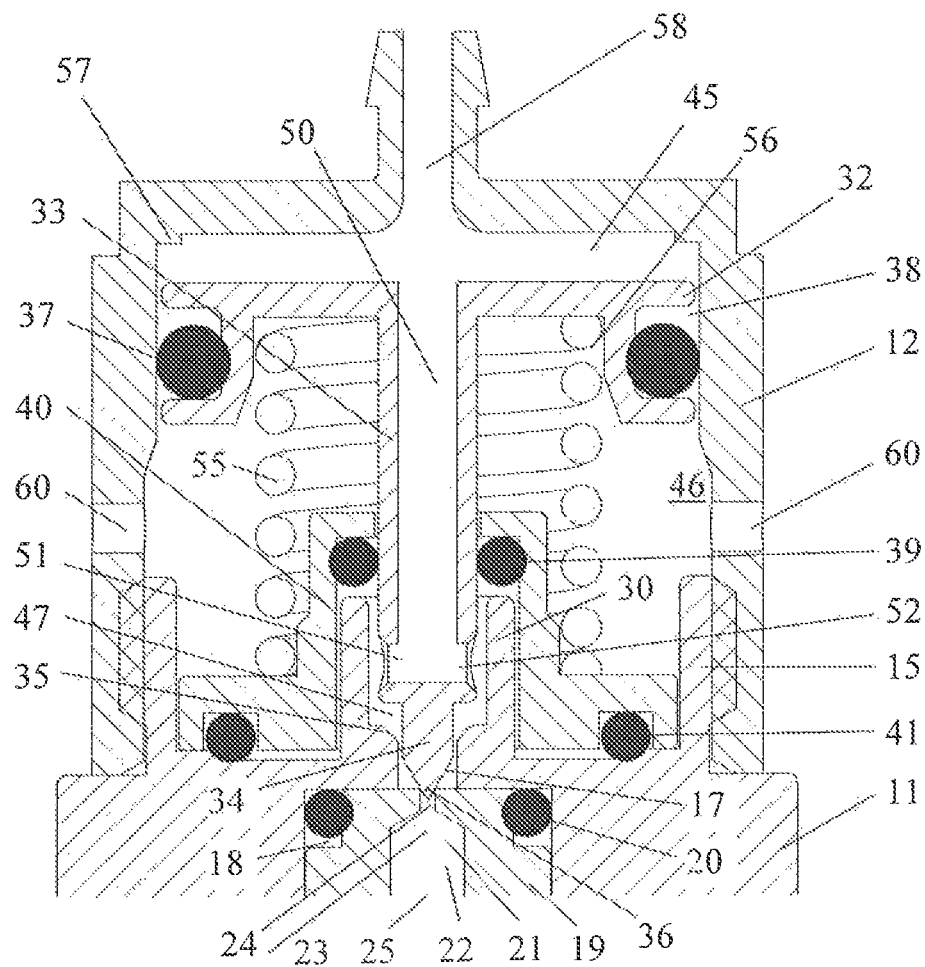
FIG. 2 is a cross sectional diagram of a gas pressure control valve in accordance with a first embodiment of the present invention in a closed position.
Figure 3:
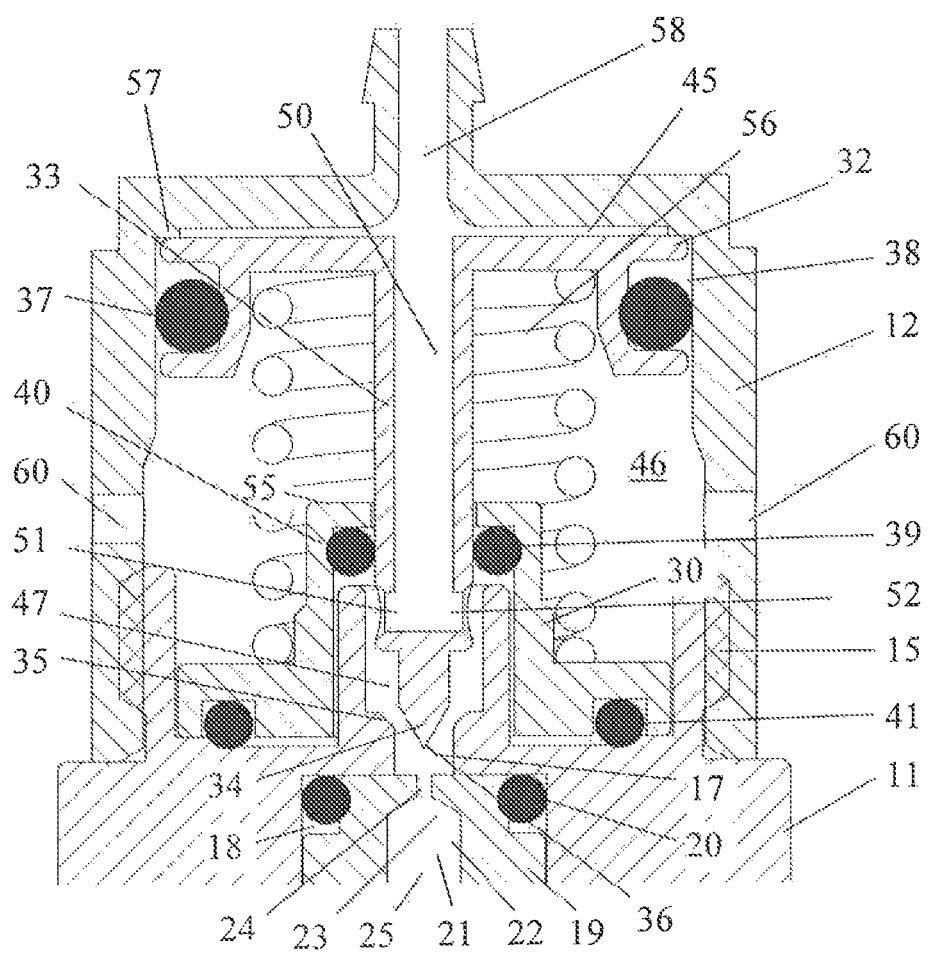
FIG. 3 is a cross sectional diagram of the gas pressure control valve of FIG. 2 in an open configuration.

FIGS. 2 and 3 are cross sectional diagrams illustrating the structure of a as pressure control valve 5 in accordance with a first embodiment of the present invention in an open and a closed configuration respectively.

Referring FIGS. 2 and 3, the gas control valve 5 comprises a substantially cylindrical valve body comprising a lower section 11 and an upper section 12 with the upper section being a substantially hollow cap. In this embodiment both the lower section 11 and the upper section 12 of the valve body are made of a metal material such as brass.

The lower section 11 of the valve body includes an outer wall 15 which protrudes above surface of the lower section 11 of the valve body adjacent the upper section 12 of the valve body. A screw thread is provided on the outer surface of the outer wall 15 which meshes with a corresponding screw thread on the interior surface of the open end of the upper section 12 of the valve body enabling the two parts of the valve body to be fixed together and held in place. It will be appreciated that in other embodiments other fixing arrangements could be used.

In the centre of lower section 11 of the valve body is a central channel 17 which extends from the surface of the lower section 11 of the valve body closest to the upper section 12 of the valve body to a cavity 18. An orifice seat 19 is retained within the cavity 18 and held in a sealing, engagement within the cavity 18 by an O-ring 20. In this embodiment the orifice seat 19 is made of a hard plastic such as nylon 66 or PEEK.

An orifice 21 which acts as a high pressure gas inlet is provided in the centre of the orifice seat 19. In this embodiment, as may best be seen in FIG. 4 which is an enlargement of the portion of FIG. 2 centered on the orifice 21, the orifice 21 comprises a lower section 22 a tapering section 23 and an upper section 24 with the upper section 24 having a narrower bore than the lower section 22. In this embodiment the upper section 24 has a diameter of 0.2 to 0.3 mm. This size is close to the limit of the size of hole than can be commercially drilled or molded, without special arrangements and excessive cost. A suitable orifice 21 can be made by drilling the orifice 21 from either side of the orifice seat 19 using two different sized drills. This arrangement simplifies manufacturing as it enables an orifice 21 with a narrow bore to be provided in the orifice seat 19 where the length of the narrow bore is limited. In alternative embodiments, a suitable orifice seat could be molded rather than drilled, to reduce cost, particularly at higher volumes.

The sealing engagement of the orifice seat 19 within the cavity 18 is such that gas passing into the cavity 18 via a gas inlet 25 in communication with the cavity 18 can only reach the central channel 17 of lower section 11 of the valve body and hence enter the interior of the upper section 12 of the valve body 2 via the orifice 21 of the orifice seat 19. In this way the orifice 21 in the orifice seat 19 acts to limit the communication between the gas inlet 25 and the interior of the upper section 12 of the valve body to a hole with a diameter of 0.3 mm.

Returning to FIGS. 2 and 3, protruding from the central portion of the surface of the lower section 11 of the valve body is a castellated collar 30 which is located coaxially and encircles the central channel 17 of the lower section 11 of the valve body. In this embodiment, this castellated collar 30 has an inner diameter of 3.34 mm and an outer diameter of 3.7 mm. The castellated collar extends for a distance of 3.3 mm from the surface of the lower section 11 of the valve body 1 with a series of 4 notches being provided in the upper edge of the wall of the collar 30 spaced evenly around the circumference of the collar 30.

As will be described later, these notches provide a gas flow path through the wall of the collar 30 to allow gas to pass from within the collar 30 to the outside of the collar 30. As such it will be appreciated that in other embodiments a similar effect could be achieved by providing one or more holes in the wall of the collar 30. It will also be appreciated that the exact number and locations of the holes or notches will not affect the functioning of the holes/notches providing a suitable gas flow path provided that the notches/holes have a sufficient cross sectional area so that they provide an adequate flow path.

Located axially within the valve body formed by the lower 11 and upper sections 12 is a piston comprising: a piston head 32 and a piston rod 33 which terminates in a sealing pin 34 aligned with the orifice 21 of the orifice seat 19.

Figure 4:
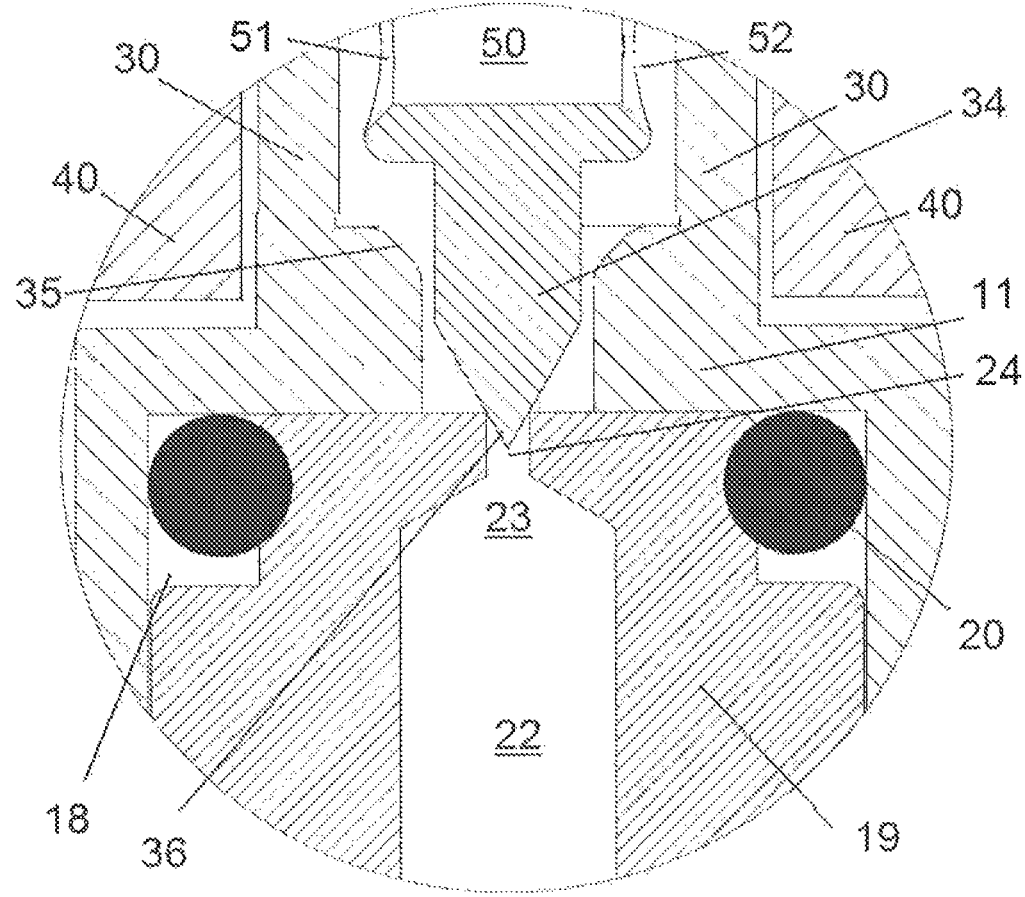
FIG. 4 is an enlargement of a portion of FIG. 2 illustrating the interaction of the scaling pin and the orifice seat of the gas pressure control valve.

As is best illustrated in FIG. 4 to assist with the alignment of the sealing pin 34 with the orifice 21 of the orifice seat 19, the central channel 17 is arranged to have a diameter similar to the diameter of the sealing pin 34 with the exception of an chamfered neck 35 towards the surface of the lower section 11 of the valve body closest to the upper section 12 of the valve body which has a slightly wider diameter. Thus in this way when the sealing pin 34 is first engaged with the central channel 17 the sealing pin is guided by the chamfered neck 35 towards the centre of the central channel 17. When the sealing pin 34 reaches the end of the central channel 17 the tip 36 of the sealing pin 34 then enters into the upper section 24 of the orifice 21 in the orifice seat 9.

Again to assist with aligning the sealing pin 34 and the orifice 21, the tip 36 of the sealing pin 34 is chamfered to a point. As the sealing pin 34 engages the upper section 24 of the orifice 21 this chamfering causes the pin 34 to become aligned with the orifice 21 and the tip 36 of the sealing pin 34 enters into the orifice 21 to the extent required so that the sealing pin 34 blocks and seals the orifice 21 thereby preventing gas from passing through the orifice 21. The alignment and chamfering of the sealing pin 34 is such to ensure that the pin 34 is centered with the orifice 21 as the piston 32, 33, 34 moves back and forth. This acts to ensure that the tip of the pin 34 does not come into contact with and damage any other portion (the sealing edge in particular) of the orifice seat 19 or enlarge the diameter of the orifice 21 and hence the extent of communication between the gas inlet 25 and the interior of the upper section 12 of the valve body is maintained at a fixed level.

Returning to FIGS. 2 and 3, the piston head 32 is in sealing, engagement through an O-ring 37 with the interior surface of the upper section 12 of the valve body with the O-ring 37 being retained within a groove 38 in the circumference of the piston head 32.

The piston rod 33 is in sealing engagement with another O-ring 39 which is held in position by the castellated collar 30 and an inner cap 40 which sits over the O-ring 39 and the castellated collar 30. This inner cap 40 extends beyond the exterior of the castellated collar 30 to the interior surface of the outer wall of the lower section 11 of the valve body with a further O-ring 41 being enclosed in a groove in the inner cap 40 near the periphery of the inner cap 40.

The arrangement of the O-rings 37, 39 & 41 is such to divide the interior of the valve into three chambers: a first chamber 45 between the piston head 32 and the end of the upper section 12 of the valve body; a second chamber 46 between the piston head 32 and the lower section 11 of the valve body and a third chamber 47 bounded in part by the inner cap 40 and extending below the piston rod 33 into the cavity 18 in the lower section 11 of the valve body via the orifice 21 in the orifice seat 19.

Within the piston rod 33, there is an axial gas conduit 50 which connects the third chamber 47 with the first chamber 45 via a pair of inlets 51,52 located in the side walls of the piston rod 33 adjacent the sealing pin 34.

A coiled compression spring 55 is provided which extends around the outside of the portion of the inner cap 40 enclosing O-ring 41 and the castellated collar 30. This spring 55 bears against the surface of the inner cap 40 which extends out towards the outer wall 15 of the lower section 11 of the valve body and against a recess 56 provided in the piston head 32 adjacent the groove 38 which contains the O-ring 37 which maintains the piston head 32 in sealing engagement with the upper section 12 of the valve body. The provision of this recess 56 means that a longer spring 55 can be accommodated without having to increase the dimensions of the upper section 12 of the valve body than would be the case if the recess 56 was not present.

The spring 55 acts against the piston head 32 lifting the sealing pin 34 provided at the end of the piston 32, 33, 34 away from the orifice seat 19 moving the piston 32, 33, 34 to the position illustrated in FIG. 3 where the periphery of the surface of the piston head 32 remote from the sealing pin 34 comes into contact with a shoulder 57 at the interior surface of the upper section 12 of the valve body. In this the position, the sealing phi 34 is removed from the orifice 21 provided in the orifice seat 19. When in this position, if the valve is connected to a high pressure gas supply, gas flows from the supply into the third chamber 47 and then into the first chamber 45 via the gas conduit 50 provided in the piston rod 33.

To the extent that gas is does not discharge via a gas outlet 58 provided in the upper section 12 of the valve body, gas pressure builds up within the first chamber 45. This pressure acts upon the surface of the piston head 32 remote from the sealing pin 34. If the pressure exceeds a certain amount, the force of the gas upon the piston head 32 overcomes the force exerted by the compression spring 55 causing the piston 32, 33, 34 to move to the position illustrated in FIG. 2. As the piston moves into this position, this causes the sealing, pin 36 to enter the orifice 21 cutting off the gas supply.

Gas will, however, still flow from the first chamber 45 out via the gas outlet 58. As this continues whilst the orifice 21 is blocked, the gas pressure within the first chamber 45 will fall. Eventually the pressure will fall to the extent that the pressure of gas on the piston head 32 no longer exerts a force on the piston head 32 sufficient to overcome the force of the compression spring 55. When this occurs the piston 32, 33, 34 will move from the position illustrated in FIG. 2 back to the position illustrated in FIG. 3, lifting the sealing pin 34 from the orifice 21 and allowing gas to flow once more. Thus in this way the valve acts to control the pressure of gas exiting the gas outlet 58.

If for any reason the gas conduit 50 or the gas inlets 51, 52 in the piston rod 33 should become blocked or the orifice seat 19 becomes damaged, gas may build up within the third chamber 47. If this were to happen pressure would then build up within the third chamber 47. When the pressure exceeded a certain amount such that the force exerted by the gas against the inner cap 40 exceeded the force exerted by the compression spring 55, this would then cause the inner cap 40 to lift, breaking the seal between the inner cap 30 and the lower section 11 of the valve body. When this occurs, this then enables has to flow from the third chamber 47 via the notches in the castellated collar 30 and underneath the inner cap 40 into the second chamber 46 and then be vented from the valve via relief apertures 60 provided in the wall of the upper section 12 of the valve body.

The relationship between pressure in the first chamber 45 and the third chamber 47 when the valve is in static equilibrium is as follows:

$$A_1 P_1 + (A_2 - A_1) P_2 + F_S - P_2 A_3 = 0 \qquad \text{Equation 1}$$

where $A_1$ is the cross sectional area of the upper section 24 of the orifice 21, $A_2$ is the cross sectional area of the piston rod 33 contained within the O-ring 41; $A_3$ is the cross sectional area of the piston head 32; $F_S$ is the force exerted by the compression spring 55; and $P_1$ and $P_2$ are the pressures at which gas enters the upper section 24 of the orifice 21 and within the first chamber 45 respectively.

From the above it follows that the extent to which the equilibrium pressure $P_2$ varies as the pressure $P_1$ at which gas enters the upper section 24 of the orifice 21 varies is highly dependent upon the cross sectional area $A_1$ of the upper section 24 of the orifice 21 as rearranging equation 1 above the relationship between the two is as follows:

$$P_2 = (A_1 P_1 + F_S)/(A_3 - A_2 + A_1) \qquad \text{Equation 2}$$

Typically the gas pressure from a gas capsule varies from between 200 bar when a capsule is full and 10 bar when gas within the capsule is almost exhausted. This dictates that for a gas pressure control valve to be able to maintain the pressure at which has leaves the first chamber 45 within tolerances of approximately 5% the size of the upper section 24 of the orifice 21 should be approximately 0.3 mm in diameter as if the diameter is any larger, significant variation in output pressure in the first chamber 45 arises unless a piston head piston 32 with a large surface area is used within the valve as set out in the following table.

| Seat diameter (mm) | Force due to 200 bar acting on seat (N) | Typical piston diameter for +/−5% pressure control with 3 bar output (mm) |
|---|---|---|
| 0.1 | 0.16 | 2.8 |
| 0.2 | 0.63 | 5.7 |
| 0.3 | 1.41 | 8.5 |
| 0.4 | 2.51 | 11.3 |
| 0.5 | 3.93 | 14.1 |
| 0.6 | 5.65 | 17.0 |
| 0.7 | 7.70 | 19.8 |

The static equilibrium equation above also indicates the importance of minimizing the cross-sectional area $A_2$ of the piston rod 33 as this value also dictates the required size and dimensions of the piston head 32 which is to be contained within the upper section 12 of the valve body and hence the overall dimensions of the valve itself. In accordance with the present application, the dimensions of the valve are minimized by enclosing the O-ring 39 between the inner cap 40 and the castellated collar 30 as in this configuration, the width of the O-ring 39 does not add to the effective cross-sectional area of the piston rod 33 as it would were the O-ring to be retained within a groove in the piston rod 33 itself.

A second embodiment of the present invention will now be described with reference to FIG. 5 which is a cross sectional illustration of a second embodiment in which like reference numerals correspond to the same portions of the valve as those referred to in the first embodiment.

In this embodiment the structure of the valve is identical to that of the first embodiment except that the shape of the piston head 32 and the shape of the upper section 12 of the valve are modified.

In the previous embodiment an O-ring 37 is shown as being retained within a groove 38 at the circumference of the piston head 32. In this embodiment rather than having a groove 38 at its circumference, the piston head 32 terminates in a stepped flange 62 which defines a recess 64 for receiving the O-ring 37. This recess 64 is open at the end closest to the gas outlet 58. The O-ring 37 is then retained in position within this recess 64 by an extension 66 of the inner surface of the walls of the upper section 12 of the valve 5 closest to the gas outlet 58.

Figure 5:
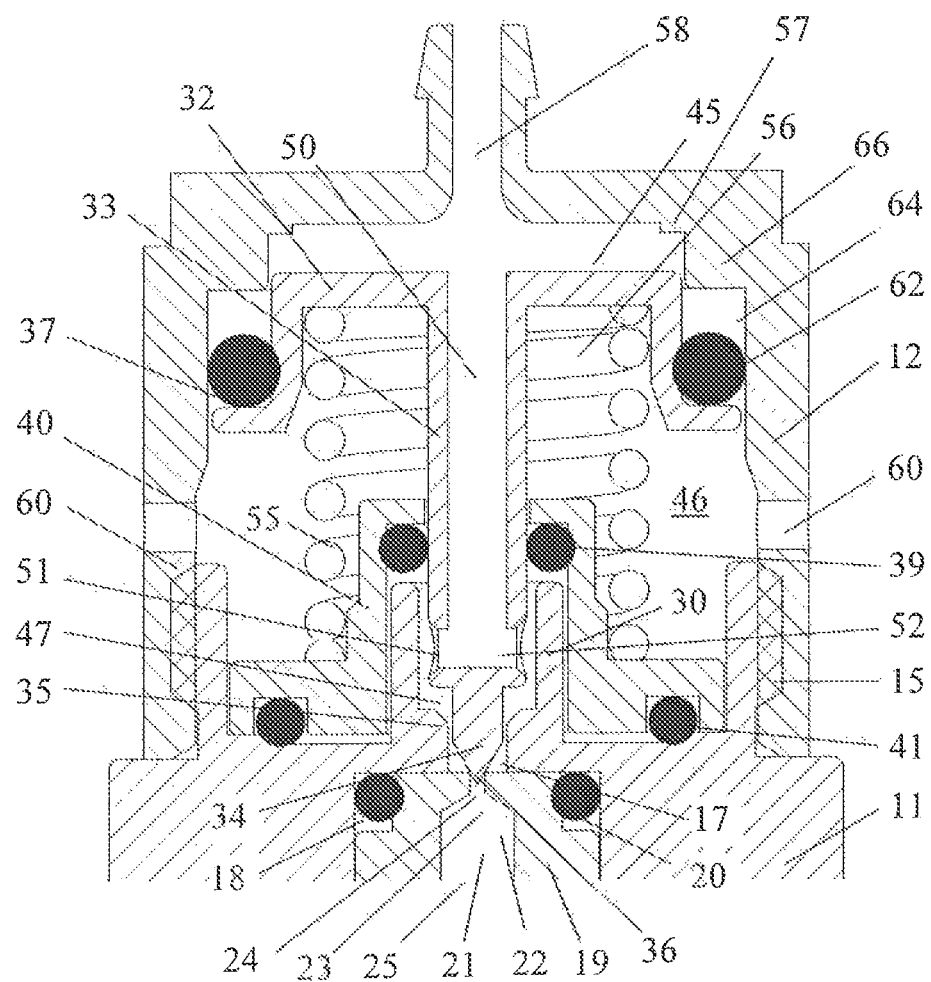
FIG. 5 is a cross sectional diagram of a gas pressure control valve in accordance with a second embodiment of the present invention.

The functioning of the valve of FIG. 5 is exactly the same at the valve of the first embodiment. However, an advantage of the design of FIG. 5 is that the piston of FIG. 5 can be molded without a split line passing through the seal provided by the O-ring 37 which would be liable to cause the valve to leak if the valve were to be formed by molding. More specifically when molding the piston of FIG. 5 a split line would occur along the extent of the stepped flange 62 rather than through the centre of the groove 38 containing the O-ring 37 as would occur if the piston of the first embodiment were to be molded. Hence the split line would no longer run along the seal between the piston head 32 and the upper section 12 of the valve body.

It will be understood that the embodiments described herein are merely exemplary and that one skilled in the art may make variations and modifications without departing from the spirit and scope of the present invention. All such variations and modifications are intended to be included within the scope of the invention as described above. Further, all embodiments disclosed are not necessarily in the alternative, as various embodiments of the invention may be combined to provide the desired result.

What is claimed is:

1. A gas pressure control valve comprising:
    a valve body having a gas inlet and a gas outlet;
    an inner cap bounding in part a chamber within the valve body wherein the chamber is in communication with the gas inlet;
    a spring loaded piston contained within the valve body, the piston comprising a piston head and a piston rod, the piston rod including a conduit providing communication between the chamber bounded in part by the inner cap and interior of the valve body adjacent the piston head and the gas outlet;
    wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap;
    wherein the piston head is in a sealing engagement with the valve body via a first seal and the piston rod is in a sealing engagement with the inner cap via a second seal contained within the chamber bounded in part by the inner cap, the second seal being held in a fixed position within the chamber; and
    wherein the valve body further comprises a collar adjacent the gas inlet wherein the second seal is held in a fixed position between the collar and the inner cap.

2. A gas pressure control valve in accordance with claim 1 wherein a gas flow path is provided to allow gas to pass through the collar to adjacent the inner cap.

3. A gas pressure control valve in accordance with claim 1 wherein a gas flow path is provided to allow gas to pass through the collar to adjacent the inner cap, the collar comprising a castellated collar wherein the castellation of the collar provides the gas flow path allowing gas to pass through the collar to adjacent the inner cap.

4. A gas pressure control valve in accordance with claim 1 wherein the gas inlet comprises a cavity containing an orifice seat in sealing engagement with the cavity wherein the communication between the chamber and the gas inlet is via an orifice in the orifice seat.

5. A gas pressure control valve in accordance with claim 4 wherein the piston rod comprises a sealing pin at an end remote from the piston head, the piston rod being arranged within the valve body so that the sealing pin seals the orifice when the piston is in the closed position.

6. A gas pressure control valve in accordance with claim 4 wherein the piston rod comprises a sealing pin at an end remote from the piston head, the piston rod being arranged within the valve body so that the sealing pin seals the orifice when the piston is in the closed position and wherein the tip of the sealing pin is chamfered to a point, wherein the piston rod is arranged within the valve body so that the tip of the sealing pin enters into and seals the orifice when the piston is in the closed position.

7. A gas pressure control valve in accordance with claim 4 wherein the piston rod comprises a sealing pin at an end remote from the piston head, the piston rod being arranged within the valve body so that the sealing pin seals the orifice when the piston is in the closed position, wherein the tip of the sealing pin is chamfered to a point, wherein the piston rod is arranged within the valve body so that the tip of the sealing pin enters into and seals the orifice when the piston is in the closed position, and wherein the chamfering of the tip of the sealing pin and the arrangement of the piston rod within the valve body is such that the sealing pin is caused to be centered within the orifice as the tip of the sealing pin enters the orifice when the piston moves from the open position to the closed position.

8. A gas pressure control valve in accordance with claim 4 wherein a gas flow path is provided to allow gas to pass through the collar to adjacent the inner cap, and wherein the orifice comprises a lower section adjacent the gas inlet, a tapering section and an upper section adjacent the chamber wherein the upper section is narrower than the lower section.

9. A gas pressure control valve in accordance with claim 4 wherein a gas flow path is provided to allow gas to pass through the collar to adjust the inner cap, and wherein at least part of the orifice has a diameter of approximately 0.3 mm.

10. A gas pressure control valve in accordance with claim 1 wherein the first seal comprises a seal contained within a groove at the circumference of the piston head.

11. A gas pressure control valve in accordance with claim 1 wherein a stepped flange defining a recess is provided at the circumference of the piston head and first seal comprises a seal retained within the recess between the piston head and the valve body.

12. A gas pressure control valve comprising:
 a valve body having a gas inlet and a gas outlet;
 an inner cap bounding in part a chamber within the valve body wherein the chamber is in communication with the gas inlet;
 a spring loaded piston contained within the valve body, the piston comprising a piston head and a piston rod, the piston rod including a conduit providing communication between the chamber bounded in part by the inner cap and interior of the valve body adjacent the piston head and the gas outlet;
 wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap;
 wherein the piston head is in a sealing engagement with the valve body via a first seal and the piston rod is in a sealing engagement with the inner cap via a second seal contained within the chamber bounded in part by the inner cap, the second seal being held in a fixed position within the chamber;
 further comprising a compression spring arranged within the valve body to bias the piston to move towards the open position; and
 wherein the compression spring encircles the inner cap and extends between a surface of the inner cap and a surface of the piston head.

13. A gas pressure control valve comprising:
 a valve body having a gas inlet and a gas outlet;
 an inner cap bounding in part a chamber within the valve body wherein the chamber is in communication with the gas inlet;
 a spring loaded piston contained within the valve body, the piston comprising a piston head and a piston rod, the piston rod including a conduit providing communication between the chamber bounded in part by the inner cap and interior of the valve body adjacent the piston head and the gas outlet;
 wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap;
 wherein the piston head is in a sealing engagement with the valve body via a first seal and the piston rod is in a sealing engagement with the inner cap via a second seal contained within the chamber bounded in part by the inner cap, the second seal being held in a fixed position within the chamber;
 further comprising a compression spring arranged within the valve body to bias the piston to move towards the open position; and
 wherein the compression spring encircles the inner cap and extends between a surface of the inner cap and a surface of the piston head, wherein a recess is provided in the piston head and the compression spring extends between a surface of the inner cap into the recess.

14. A gas supply apparatus comprising:
 a housing defining a docking station for receiving a gas capsule; and a gas pressure control valve, arranged to receive gas from a gas capsule inserted in the docking station and pass gas to an output, wherein the gas pressure control valve comprises:
 a valve body having a gas inlet and a gas outlet;
 an inner cap bounding in part a chamber within the valve body wherein the chamber is in communication with the gas inlet;
 a spring loaded piston contained within the valve body, the piston comprising a piston head and a piston rod, the piston rod including a conduit providing communication between the chamber bounded in part by the inner cap and interior of the valve body adjacent the piston head and the gas outlet;
 wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap; and
 wherein the piston head is in a sealing engagement with the valve body via a first seal and the piston rod is in a sealing engagement with the inner cap via a second seal contained within the chamber bounded in part by the inner cap, the second seal being held in a fixed position within the chamber.

15. A device for forming non-thermal plasma comprising:
 a gas supply apparatus comprising a housing defining a docking station for receiving a gas capsule; and a gas pressure control valve, arranged to receive gas from a gas capsule inserted in the docking station and pass gas to an output, wherein the gas pressure control valve comprises:
 a valve body having a gas inlet and a gas outlet;
 an inner cap bounding in part a chamber within the valve body wherein the chamber is in communication with the gas inlet;
 a spring loaded piston contained within the valve body, the piston comprising a piston head and a piston rod, the piston rod including a conduit providing communication between the chamber bounded in part by the inner cap and interior of the valve body adjacent the piston head and the gas outlet;
 wherein the piston is operable to move between a closed configuration in which the piston rod prevents communication between the gas inlet and the chamber bounded in part by the inner cap and an open configuration in which the piston rod permits communication between the gas inlet and the chamber bounded in part by the inner cap; and wherein the piston head is in a sealing engagement with the valve body via a first seal and the piston rod is in a sealing engagement with the inner cap via a second seal contained within the chamber bounded in part by the inner cap, the second seal being held in a fixed position within the chamber; and a plasma generating cell operable to receive gas from the output and apply an electrical potential to the received gas to generate a non-thermal plasma.

* * * * *